US006259226B1

United States Patent
Kaitani et al.

(10) Patent No.: US 6,259,226 B1
(45) Date of Patent: Jul. 10, 2001

(54) CONTROLLER FOR AC MOTOR

(75) Inventors: Toshiyuki Kaitani; Tetsuaki Nagano; Tsutomu Kazama; Masanori Ozaki; Fumio Kumazaki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/486,606
(22) PCT Filed: Sep. 3, 1998
(86) PCT No.: PCT/JP98/03957
   § 371 Date: Mar. 1, 2000
   § 102(e) Date: Mar. 1, 2000
(87) PCT Pub. No.: WO00/14866
   PCT Pub. Date: Mar. 16, 2000
(51) Int. Cl.[7] .................................................. H02P 7/36
(52) U.S. Cl. ................................................ 318/798; 318/801
(58) Field of Search .................................. 318/798, 799, 318/800, 801, 805, 812

(56) References Cited

U.S. PATENT DOCUMENTS

| | | | |
|---|---|---|---|
| 4,680,526 | * 7/1987 | Okuyama et al. | 318/802 |
| 5,298,847 | * 3/1994 | Kerkman et al. | 318/800 |
| 5,502,360 | * 3/1996 | Kerkman et al. | 318/805 |
| 5,777,447 | * 7/1998 | Okano | 318/434 |
| 5,796,228 | * 8/1998 | Kojima et al. | 318/605 |
| 5,841,263 | * 11/1998 | Kaneko et al. | 318/807 |
| 5,963,007 | * 10/1999 | Toyozawa et al. | 318/799 |
| 6,005,365 | * 12/1999 | Kaneko et al. | 318/700 |

FOREIGN PATENT DOCUMENTS

| | | |
|---|---|---|
| 6-43191 | 2/1994 | (JP) . |
| 6-121573 | 4/1994 | (JP) . |
| 6-276781 | 9/1994 | (JP) . |
| 8-47280 | 2/1996 | (JP) . |
| 9-191699 | 7/1997 | (JP) . |

* cited by examiner

Primary Examiner—Khanh Dang
Assistant Examiner—Rina I. Duda
(74) Attorney, Agent, or Firm—Sughrue, Mion, Zinn, Macpeak & Seas, PLLC

(57) ABSTRACT

There is provided a controlling device for an AC motor having a structure in which a current of a three phase brushless DC motor is detected and then converted to a rotor coordinate system, to separately control a torque split current (q axis) and an exciting split current (d axis), wherein an offset is estimated with a DC component of a multiplied value of the values corresponding to a d axis voltage command which is an output of an exciting split current controller and an electrical angle, and the detected current is compensated for, so that an offset of a current detector may be estimated and compensated for during its operation without stopping its rotation and the motor can rotate smoothly without a torque ripple, even in the case in which the current detector has an offset error or in the case in which an offset changes due to a temperature drift.

9 Claims, 11 Drawing Sheets

(a)

(b)

CONTROLLER FOR AC MOTOR

TECHNICAL FIELD

The present invention relates to a controlling device for an AC motor, more specifically to a controlling device for estimating an offset of a current detector that detects a current flowing to a brushless DC motor used as an AC motor and conducting an offset cancellation of a detected current value.

BACKGROUND ART

It has been known that an offset of a current detector is a cause of a torque ripple and affects a precision of positioning and a rotational irregularity in a low velocity rotation region, and various methods have been taken for an offset adjustment of a current detector.

FIG. 14 shows a structure of a conventional controlling device for an AC motor, which will be explained with reference to FIG. 14. FIG. 14 is a control block diagram such as the one found in "Practice of Logic and Design of AC Servo System," published by Sogo Denshi Publishing Co., Ltd., page 86. For simplicity, a control loop of a position is omitted.

In FIG. 14, reference numeral 1 denotes a brushless DC motor; 2, an encoder; and 3, a PWM inverter for driving the brushless DC motor 1. Reference numeral 4 denotes a current detector that detects currents iua, iva and iwa flowing to the brushless DC motor by output voltages Vua, Vva and Vwa of the PWM inverter 3. In FIG. 14, a mechanism for detecting two phase currents iva and iwa is shown.

Reference numeral 5 denotes a velocity and position signal processor that outputs a mechanical angular velocity (actual velocity) wrm, an electrical angle velocity wre and an electrical angle θre upon receiving a signal from the encoder 2. Reference numeral 6 denotes a sine wave generator that inputs the electrical angle θre output by the velocity and position signal processor 5 and outputs sinθre and cosθre to coordinate converters 7 and 17 hereinafter referred to. Reference numeral 7 denotes a three phase/d-q coordinate converter that inputs the currents iva and iwa detected by the current detector 4 and converts the currents to an exciting split current ida and a torque split current iqa of a rotor coordinate system by the output of the sine wave generator 6.

Reference numeral 8 denotes a subtractor that calculates a velocity deviation of a velocity command wrm* and the actual velocity wrm. Reference numeral 9 denotes a velocity controller that inputs the velocity deviation obtained from the subtractor 8 and outputs a torque split current command iqa*. The velocity controller 9 includes, for example, a proportional plus integration PI. Reference numeral 10 denotes a subtractor that calculates the difference between the torque split current command iqa* and the torque split current iqa output from the three phase/d-q coordinate converter 7. Reference numeral 11 denotes a q axis current controller that inputs a q axis current deviation output by the subtractor 10 and outputs a non-interference q axis voltage command Vqz*. The q axis current controller 11 includes, for example, a proportional plus integration PI.

Reference numeral 12 denotes a subtractor that calculates the difference between a d axis current command ida* and the exciting split current ida output from the three phase/d-q coordinate converter 7. Reference numeral 13 denotes a d axis current controller that inputs the d axis current deviation output from the subtractor 12 and outputs a non-interference d axis voltage command Vdz*. Reference numeral 14 denotes a non-interference controller that conducts non-interference control in cooperation with adders 15 and 16.

Now, the non-interferential control is briefly explained.

The brushless DC motor 1 has velocity electromotive forces interfering each other between the d and q axes. They affect the exciting split current ida and the torque split current iqa but cannot be directly controlled. Hence, a control in which the velocity electromotive force are calculated and an interference therebetween is then cancelled is referred to as a non-interference control.

More specifically, the non-interference control is conducted by the d axis voltage command Vda* and the q axis voltage command Vqa* as shown in the formulas below.

$$Vda^* = Vdz^* - wre \cdot La \cdot iqa \quad (1)$$

$$Vqa^* = Vqz^* + wre(\phi fa + La \cdot ida) \quad (2)$$

where $\phi fa$ is the number of flux inter-linkage of an armature winding and La is a self inductance of an armature winding.

That is, in a non-interference control, the d axis voltage command Vda* and the q axis voltage command Vqa* are calculated by adding $-wre \cdot La \cdot iqa$ and $wre \cdot (\phi fa + La \cdot ida)$ which is components of a velocity electromotive force to the non-interference d- and q axis voltage commands Vda* and Vqz*. By doing so, an interference by the q axis current (torque split current) iqa can be prevented by $-wre \cdot La \cdot iqa$ which is a component of a velocity electromotive force, for example, in the d axis.

By the d axis voltage command Vda* and the q axis voltage command Vqa* calculated in this way and the output from the sine wave generator 6, three phase AC voltage commands Vua*, Vva* and Vwa* are coordinate converted to be output in the d-q/three phase coordinate converter 17, and the inverter 3 conducts the PWM and supplies a voltage to the brushless DC motor 1.

Further, an offset may exist in the above mentioned current detector 4. The offset is irrelevant to the action of the motor 1, but is an offset portion relevant to the current detector 4 and a noise portion that is detected even during stoppage of the motor 1. The current offset generates a ripple portion that may vary depending on the electrical angle in respect of the torque of the motor 1, and generates one torque ripple for respective one rotations of the electrical angle.

In some conventional art, in order to compensate for the offset in the current detector 4, a current feedback is calculated by subtracting the offset from the current value detected at the time of current control, given that the value output from the current detector 4 be the offset volume of the current detector 4, in an open status in which no current flows to the motor 1 during an emergency stoppage such as a time when a power source is turned on.

However, such a met hod has a problem that it cannot cope with a drift caused by a temperature change of the current detector 4. The current detector 4 usually includes a current/voltage converter and an AID converter. These electronic components change its characteristics corresponding to a temperature, which causes a drift. The offset of the current detector 4 changes due to the drift as time passes.

In order to cope with the variation of the offset due to the temperature drift, several methods has been devised.

For example, in the method for controlling an AC servo motor described in Japanese Patent Application Laid-Open No. Hei 8-47280, a method for calculating and renewing an offset by detecting an actual current each time when a voltage command is set zero is proposed. However, according to this method, a motor instantly rotates upon turning on a power source and, when it continues to rotate for approximately five minutes, an offset cannot be compensated for during that period and a torque ripple is generated. Only a few problems reside in an application in which a voltage command is frequently set zero, i.e., a motor is stopped, but applications are limited.

In addition, in a motor drive device described in Japanese Patent Application Laid-Open No. Hei 6-276781, a method for estimating an offset value at the time of outputting a zero torque is proposed. This method also has a similar problem because it can compensate for an offset only in the state in which a motor is stopped as in Japanese Patent Application Laid-Open No. Hei 8-47280 as described above.

As has been explained, the above mentioned controlling device for an AC motor has the following problems:

(1) A torque ripple is generated due to an offset of the current detector.

(2) An offset of the current detector changes due to a temperature drift as time passes.

(3) An offset cancellation value can be estimated again only in a limited state such as a motor stoppage. That is, a torque ripple caused by an offset that produces temperature drifts during rotation of a motor cannot be reduced.

An object of the present invention is to solve the above mentioned drawbacks and to provide a controlling device for an AC motor-which estimates an offset of a current detector, compensates for a current detection value and does not generate a torque ripple by the current detector while a motor is actually operating, i.e., even at the time of rotation and the presence of load.

DISCLOSURE OF THE INVENTION

In order to attain the above mentioned object, a controlling device for an AC motor in accordance with the present invention comprises: a three phase AC motor; current detecting means for detecting a current flowing to the three phase AC motor; rotational coordinate converting means for inputting a current detected by the current detecting means and converting it to an exciting split current and a torque split current in a rotational coordinate system; current controlling means for respectively outputting a d axis voltage command and a q axis voltage command that are based on an exciting split current deviation and a torque split current deviation given by the comparative difference between the exciting split current and the torque split current from the rotational coordinate converting means, and an exciting split current command and a torque split current command; an encoder directly connected to the three phase AC motor; signal processing means for calculating a mechanical angular velocity, an electrical angle velocity and an electrical angel of the three phase AC motor based on a signal from the encoder; a sine wave generator for generating a sine wave corresponding to the electrical angle provided by the signal processing means; three phase coordinate converting means for inputting the d axis voltage command and the q axis voltage command from the current controlling means and the sine wave from the sine wave generator and coordinate converting it to a three phase AC voltage command to output; an inverter for supplying a driving voltage to the three phase AC motor based on the three phase AC voltage command from the three phase coordinate converting means; offset estimating means for estimating an offset of the current detecting means based on the d axis voltage command from the current controlling means and the output from the signal processing means; and a subtracting means for subtracting an offset estimation value provided by the offset estimating means from the current detected by the current detecting means and giving an offset canceled current value to the rotational coordinate converting means.

It is further characterized in that the offset estimating means comprises a band-pass filter for extracting a component corresponding to the electrical angle velocity of the d axis voltage command based on the d axis voltage command from the current controlling means and the electrical angle velocity provided by the signal processing means, an absolute value circuit for rectifying a signal output from the band-pass filter, a low-pass filter for extracting a low frequency component of the signal from the absolute value circuit, a switch for switching a phase conducting an estimation of a current offset using the signal of the low-pass filter, and estimating means for estimating a current offset based on the signal from the low-pass filter that is input via the switch.

It is further characterized in that the offset estimating means comprises sine wave generating means for outputting a sine wave corresponding to the electrical angle provided by the signal processing means, multiplying means for conducting a multiplication of the d axis voltage command from the current controlling means and the sine wave corresponding to the electrical angle provided by the sine wave generating means, filtering means for extracting a DC component from the output of the multiplying means, and estimating means for estimating a current offset based on a signal from the filtering means.

It is further characterized in that the offset estimating means comprises a first multiplier for calculating the product of the torque split current from the rotational coordinate converting means and the electrical angle velocity provided by the signal processing means, a gain circuit for obtaining a signal proportional with the output of the first multiplier, and a first adder for obtaining a non-interference d axis voltage command that is calculated by adding the d axis voltage command from the current controlling means and a signal proportional to the electrical angle velocity via the gain circuit, and the non-interference d axis voltage command is used as the d axis voltage command given to the multiplying means.

It is further characterized in that the offset estimating means comprises a low-pass filter for extracting a DC component of the non-interference d axis voltage command given to the multiplying means, an inductance varying portion estimator for estimating a varying portion of an inductance from the output of the low-pass filter, a second multiplier for multiplying the output of the first multiplier with the output of the inductance varying portion estimator, and a second adder for obtaining a new non- interference d axis voltage command that is calculated by adding the output of the first adder and the output of the second multiplier, and the new non-interference d axis voltage command obtained from the second adder is used as the d axis voltage command given to the multiplying means.

It is further characterized in that the filtering means includes a first order lag filter having a predetermined cutoff frequency, and the estimating means includes a PI controller having a predetermined proportional gain and a predetermined breakpoint frequency, the cutoff frequency and the breakpoint frequency varying according to the electrical angle velocity provided by the signal processing means.

It is further characterized in that the offset estimating means comprises a phase table for outputting a phase corresponding to the electrical angle velocity provided by the signal processing means and a third adder for adding the electrical angle provided by the signal processing means and the phase output by the phase table, wherein the sine wave generating means generates a sine wave corresponding to the output from the third adder.

It is further characterized in that the non-interference d axis voltage command given to the multiplying means is calculated using an average value of values that are calculated by adding the d axis voltage commands obtained each time a predetermined sampling is conducted and by adding the electrical angle velocity and the torque split current, respectively.

It is further characterized in that the current detecting means includes a structure for detecting each phase current of the three phase AC, and the subtracting means includesf a structure for calculating a current value offset canceled for each phase of the three phase AC, and the offset estimating means further comprises a fourth adder for adding a detected current of three phase portion detected by the current detecting means, one phase portion offset estimating means for estimating an offset of one phase portion by the output of the fourth adder, and adding means for adding the offset of one phase portion estimated by the one portion offset estimating means to the offset from the offset estimating means estimated based on the d axis voltage command from the current controlling means and the output from the signal processing means, and for obtaining an offset of two phase other than the offset of one phase portion estimated by the one phase portion offset estimating means.

BEST MODE FOR CARRYING OUT THE INVENTION

First Embodiment

Figure 1:
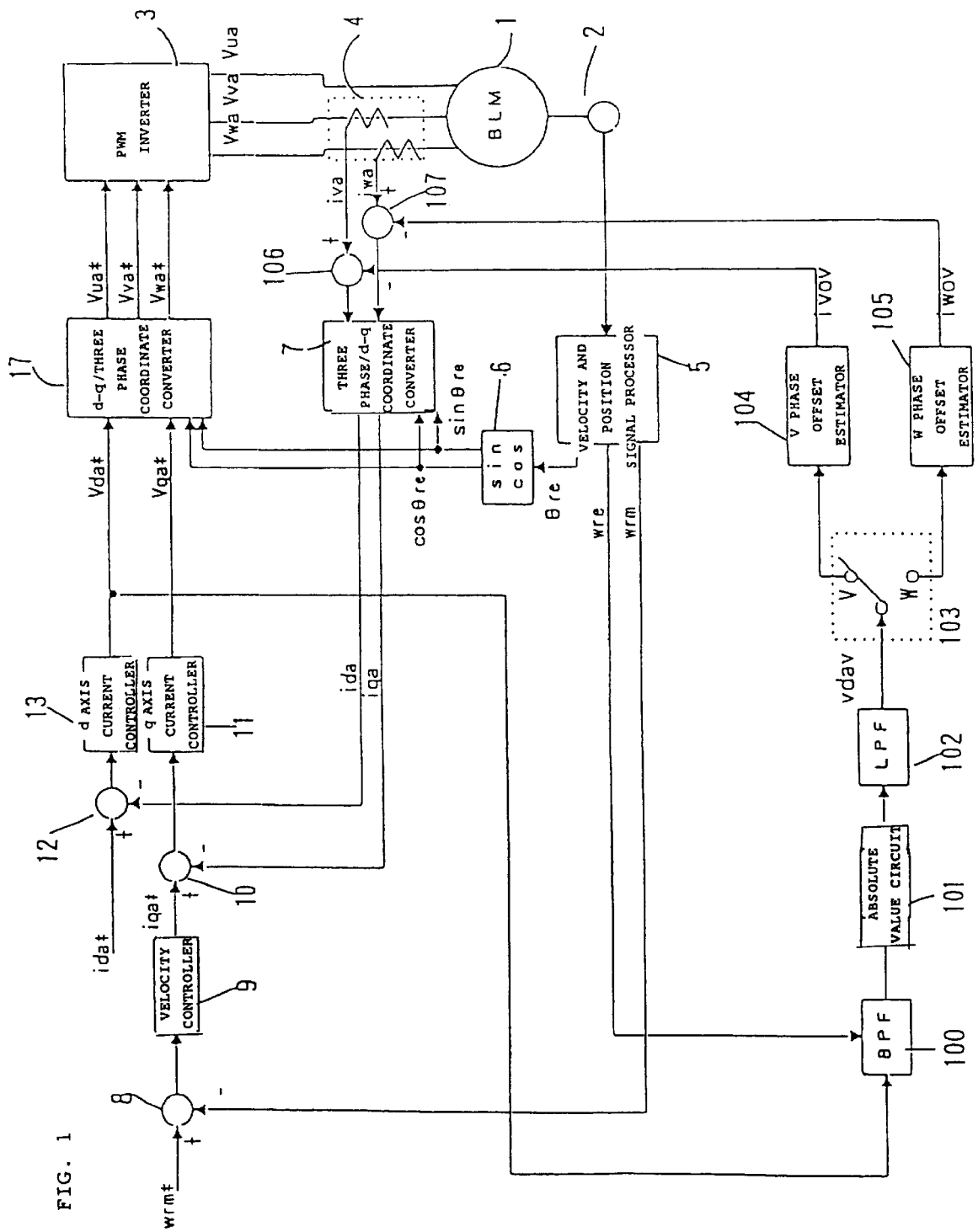
FIG. 1 is a structural view showing a controlling device for an AC motor in accordance with a first embodiment of the present invention.

FIG. 1 shows a structure of a controlling device for an AC motor in accordance with a first embodiment of the present invention.

Figure 14:
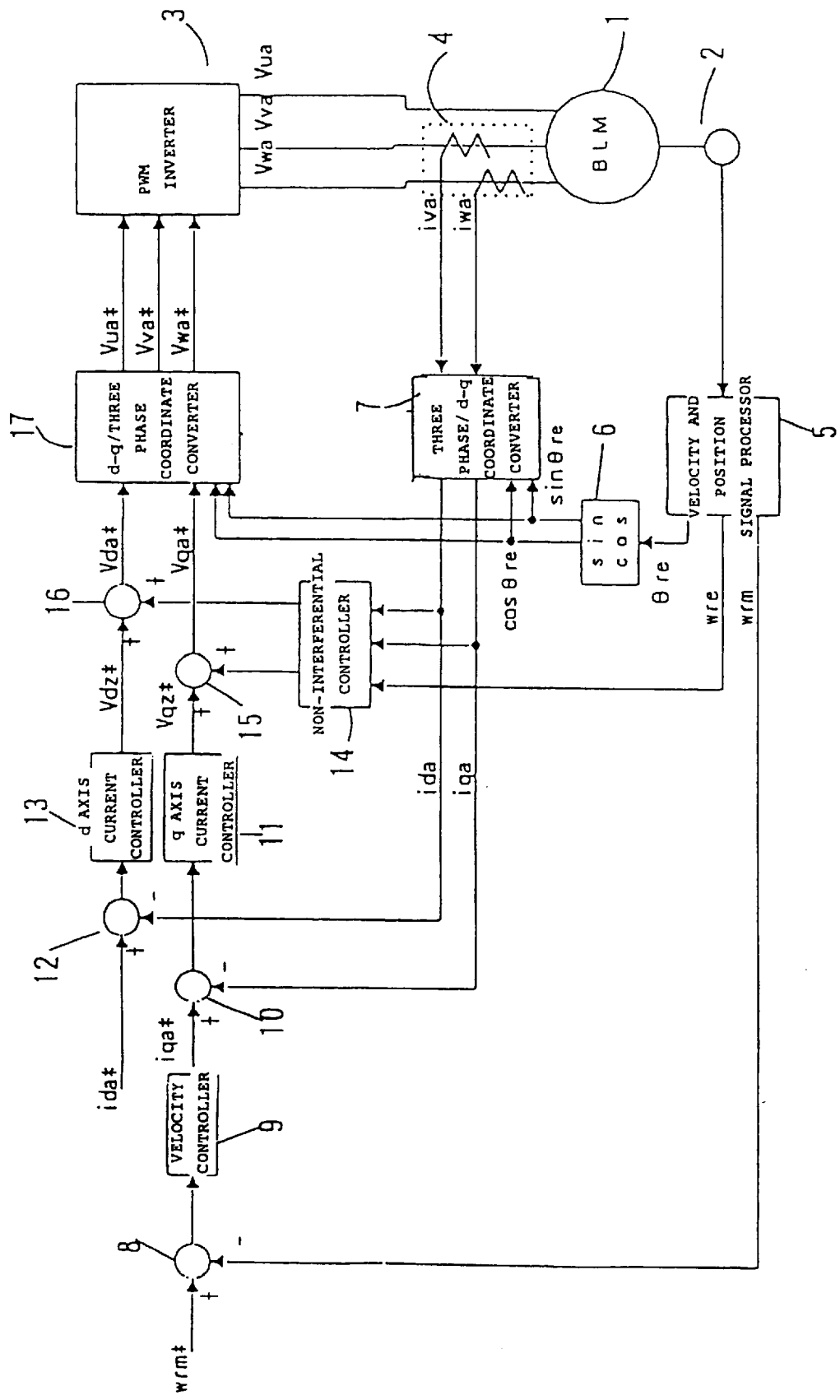
FIG. 14 is a structural view showing a conventional controlling device for an AC motor.

In FIG. 1, the same parts as those in the conventional art shown in FIG. 14 are given the same numbers and their explanations are omitted. In addition, a non-interference control is also omitted for simplicity.

New reference numeral 100 denotes a band-pass filter for extracting a component corresponding to the electrical angle velocity wre of the d axis voltage command Vda*; 101, an absolute value circuit for rectifying a signal output from the band-pass filter 100; 102, a low-pass filter for extracting a low frequency component of a signal in the absolute value circuit 101; and 103, a switch for switching which current offset of either a V phase or a W phase is estimated using the signal of the low-pass filter 102. The switch 103 operates at an appropriate time interval such that it transfers the signal to the V side of the switch 103 when the V phase offset is estimated and transfers the signal to the W side of the switch 103 when the W phase offset is estimated.

Reference numeral 104 denotes a V phase offset estimator for estimating an offset of the V phase when the switch 103 is in the V side; 105, a W phase offset estimator for estimating an offset of the W phase when the switch 103 is in the W side; 106, a subtractor for outputting a value that is calculated by subtracting an estimated value from the V phase offset estimator 104 from the output of the current detector 4 to the three phase/d-q coordinate converter 7; and 107, a subtractor for outputting a value that is calculated by subtracting an estimated value from the W phase offset estimator from the output of the current detector 4 to the three phase/d-q coordinate converter 7.

Here, before explaining detailed operations of FIG. 1, a description is give of how an affection of the current detecting offset appears in the d axis voltage command Vda*.

Figure 2:
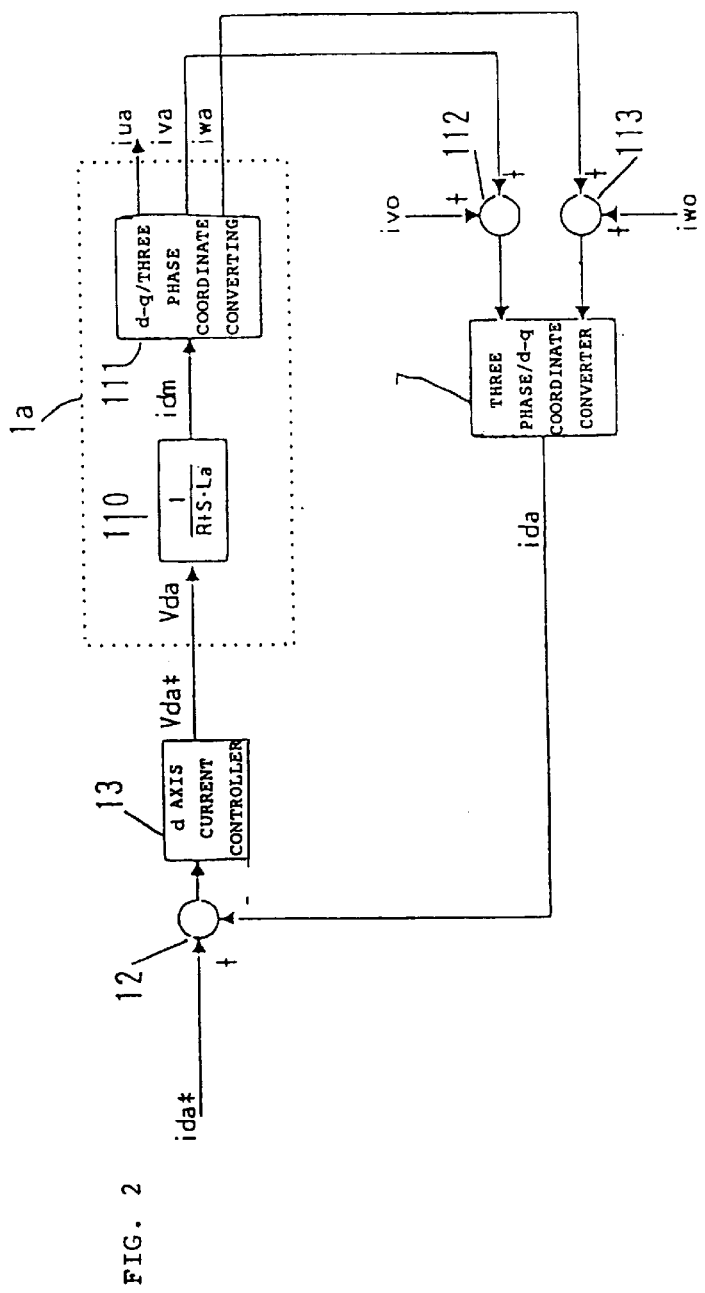
FIG. 2 is a block diagram showing a d axis current control loop of a conventional controlling device for an AC motor to be used for an explanation of the present invention.

FIG. 2 is a view in which a d axis current loop at the time of the absence of load is only taken out of that in the conventional art shown in FIG. 14. In FIG. 2, symbol 1a denotes a block in which a d axis part of the brushless DC motor 1 is only taken out. In 1a, reference numeral 110 denotes a transfer function block of the d axis of the motor 1 which inputs a d axis voltage Vda and outputs a d axis current idm. Reference numeral 111 denotes a d-q/three phase coordinate converting block inside the motor 1 which inputs a d axis current idm and outputs three phase currents iua, iva and iwa. Reference numeral 112 denotes an adder that simulates a current detecting offset of the V phase, to which the value of a V phase current offset ivo is added. Reference numeral 113 also denotes an adder, to which the value of a W phase current offset iwo is added. A d axis current ida is calculated by coordinate converting the current value that is calculated by adding the values of the current offsets ivo and iwo by the three phase/d-q coordinate converter 7.

There is no voltage error in FIG. 2, given that the d axis voltage command Vda* coincide with the d axis voltage Vda of the motor 1. Here, when the current offsets ivo and iwo are zero, they are detected as the d axis current idm inside the motor 1 and are coordinate converted, and the thus calculated d axis current ida coincides with the d axis current idm.

However, if an offset exists, the component becomes the same frequency component (1f component) as the electrical angle frequency by the coordinate converter 7 and is then added to the d axis current ida. But the 1f component is not contained in the d axis current ida output from the coordinate converter 7 and cannot be detected from the d axis current ida because the d axis current command ida* is usually controlled with ida*=0. To the contrary, the d axis current idm inside the motor 1 oscillates by the 1f component. Of course, this also appears as an oscillation of the 1f component in the d axis voltage command Vda*.

Figure 3:
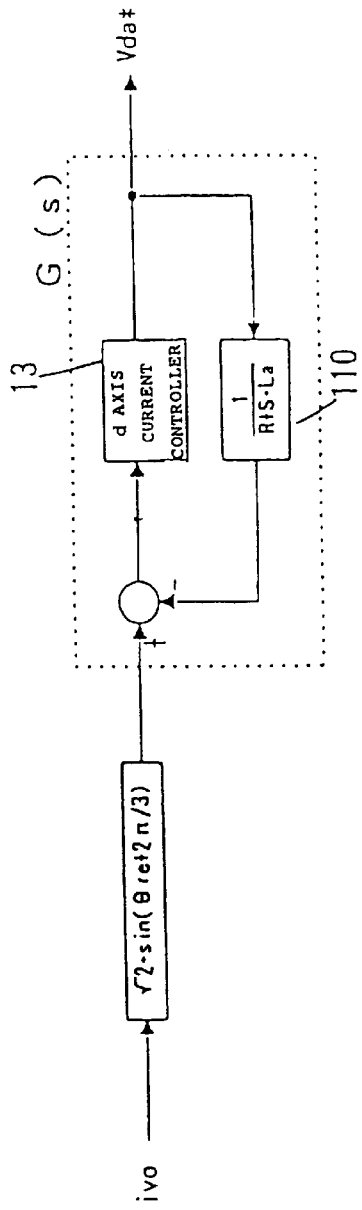
FIG. 3 is a block diagram showing a transfer characteristic from a V phase offset to a d axis voltage command assuming the block diagram shown in FIG. 2 as a W phase offset.

Given a block diagram shown in FIG. 2 as the W-phase offset iwa=0, a block diagram of FIG. 3 shows a transfer characteristic from the V phase offset ivo to the d axis voltage command Vda*. In FIG. 3, G (s) indicates a block of transfer function of a part surrounded by a dotted line, and if the d axis current controller 13 is represented as Gi·(1+ wi/s) by the proportional plus integration control, the transfer function G (s) is given as follows.

$$G(s) = Gi \cdot \{La \cdot S^2 + (R + Wi \cdot La) \cdot S + Wi \cdot R\} / \{La \cdot S^2 + (R + Gi) \cdot S + Gi \cdot Wi\} \quad (3)$$

where R is armature winding resistance.

By the transfer function, G (s)=R in the adequate low velocity region. Hence, when an offset of the V phase only exists, in the adequate low velocity region, the following is obtained.

$$Vda^* = ivo \cdot R \cdot \sqrt{2} \cdot \sin(\theta re + 2\pi/3) \quad (4)$$

Similarly, considering the case in which an offset of the W phase also exists, the following is obtained.

$$Vda^* = ivo \cdot R \cdot \sqrt{2} \cdot \sin(\theta re + 2\pi/3) + iwo \cdot R \sqrt{2} \cdot \sin(\theta re + \pi/3) \quad (5)$$

In this way, it has been found that a component that is proportional to the V phase current offset ivo and the W phase current offset iwo and oscillates with 1f appears in the d axis voltage command Vda*. The first embodiment is to structure such that only the 1f component of the d axis voltage command Vda* is extracted and an offset is estimated by the amplitude of the 1f component, an example of which is shown in FIG. 1.

Subsequently, a description is now given of how an offset is specifically estimated and canceled with the structure of FIG. 1.

The average value vdav of the 1f component of the d axis voltage command Vda* can be taken out by the band-pass filter 100, the absolute value circuit 101 and the low-pass filter 102. The average value vdav is the smallest when the V phase current offset ivo and the W phase current offset iwo are zero.

Therefore, in the first place, the switch 103 is connected to the V side and the V phase current offset is estimated. The V phase offset estimator 104 operates, for example, as follows:

The V phase offset estimator 104 differentiates the input and, when the differentiated value is positive, operates an offset cancellation value to the negative direction, and to the contrary, when the differentiated value is negative, operates an offset cancellation value to the positive direction.

Figure 4:
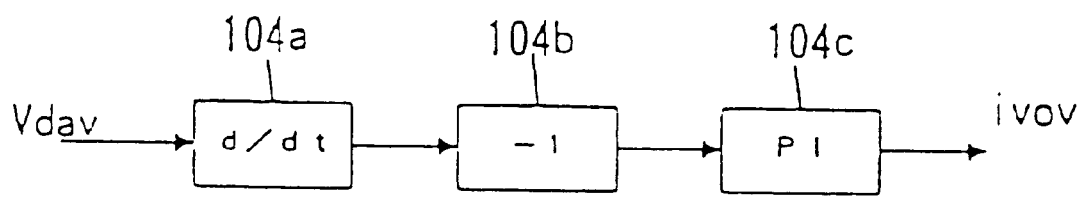
FIG. 4 is a block diagram showing an example of a specific structure of the V phase offset estimator of FIG. 1.

FIG. 4 shows an example of a specific internal structure of the V phase offset estimator 104.

Figure 5:
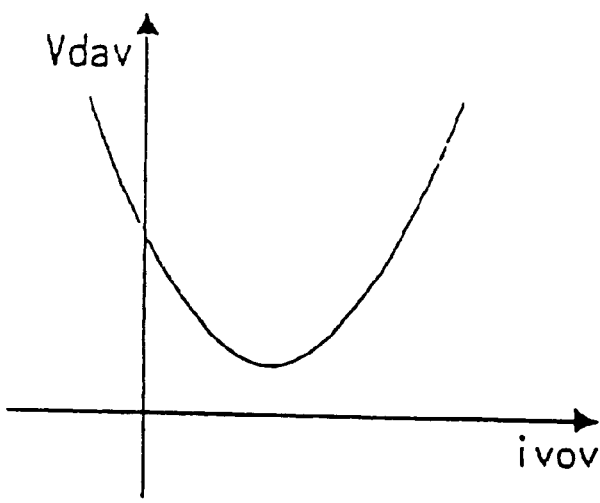
FIG. 5 is a graph showing the relation between the V phase offset and an 1 f component of a d axis voltage command to be used for an explanation of FIG. 1.

In FIG. 4, symbol 104a denotes a differentiator; 104b, a code inverter; and 104c, a PI controller. The average value vdav is input and an operating volume ivov is output. FIG. 5 shows a transfer function of a loop when the V phase offset estimator 104 does not exist in FIG. 1 and, as shown in FIG. 5, the average value vdav changes according to the operating volume ivov. Therefore, the control loop shown in FIG. 4 is obtained, so that an offset cancellation value of the current detector 4 with which the average value vdav becomes successfully the smallest can be estimated.

In this way, the W phase current offset is calculated in the same manner after the V phase current offset is calculated. This makes it possible to always estimate an offset on line without stopping the motor 1 by repeating the estimation in order, and the torque ripple never increases even if a temperature drift occurs in the operating state.

Second Embodiment

Figure 6:
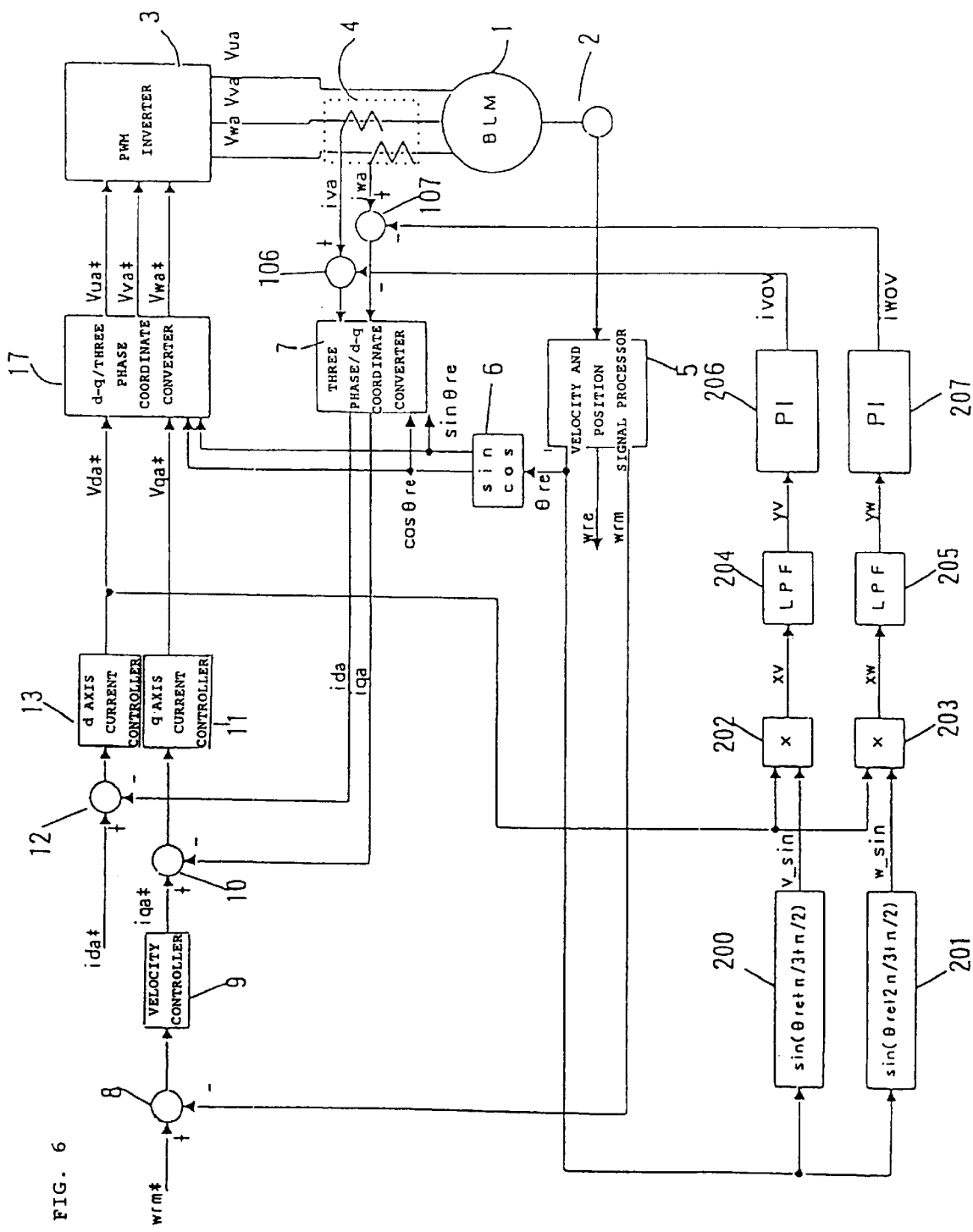
FIG. 6 is a structural view showing a controlling device for an AC motor in accordance with a second embodiment of the present invention.

FIG. 6 is a block diagram of a controlling device for an AC motor in accordance with a second embodiment of the present invention.

In FIG. 6, the same parts as those in the first embodiment shown in FIG. 1 are given the same numbers and their explanations are omitted. New reference numeral 200 denotes a sine wave generator for inputting the electrical angle θre and outputting a sine wave corresponding to the electrical angle θre represented by sin (θre+π/3+π/2) and this output is herein referred to as v_sin. Reference numeral 201 denotes a sine wave generator for inputting the electrical angle θre and outputting a sine wave corresponding to the electrical angle θre represented by sin (θre+2π/3+π/2) and the output is herein referred to as w_sin. Reference numeral 202 denotes a multiplier for conducting a multiplication of the sine wave v_sin and the d axis voltage command Vda* and its output is referred to as xv. Reference numeral 203 denotes a multiplier for conducting a multiplication of the sine wave w_sin and the d axis voltage command Vda* and its output is referred to as xw. Reference numeral 204 denotes a low-pass filter circuit for extracting a DC component of the output xv of the multiplier 202 and its output is referred to as yv. Reference numeral 205 denotes a low-pass filter circuit for extracting a DC component of the output xw of the multiplier 203 and its output is referred to as yw. Reference numeral 206 denotes a V phase offset estimator for estimating a V phase offset using the output yv of the filter circuit 204 and includes, for example, a proportional plus integration PI. Reference numeral 207 denotes a W phase offset estimator for estimating a W phase offset using the output yw of the filter circuit 205 and includes, for example, a proportional plus integration PI.

An operation is now explained.

In the above mentioned structure, the outputs v_sin and w_sin of the sine wave generators 200 and 201 are as shown in the following formulas (6) and (7):

$$v\_sin = \sin(\theta re + \pi/3 + \pi/2) \quad (6)$$

$$w\_sin = \sin(\theta re + 2\pi/3 + \pi/2) \quad (7)$$

Here, when the d axis voltage command Vda* shown in the formula (5) is multiplied by the output v_sin of the sine wave generator 200 shown in the formula (6) by the multiplier 202, the output xv of the multiplier 202 is as shown in the following formula (8):

$$xv = Vda* \cdot v\_sin \quad (8)$$
$$= \{ivo \cdot R \cdot \sqrt{2} \cdot \sin(\theta re + 2\pi/3) +$$

-continued $$iwo \cdot R \cdot \sqrt{2} \cdot \sin(\theta re + \pi/3)\} \cdot$$
$$\sin(\theta re + \pi/3 + \pi/2)$$
$$= \sqrt{(6/4)} \cdot ivo \cdot R -$$
$$\sqrt{(2/2)} \cdot ivo \cdot R \cdot \cos(2\theta re + 3\pi/2) -$$
$$\sqrt{(2/2)} \cdot iwo \cdot R \cdot \cos(2\theta re + 7\pi/6)$$

In the filter circuit 204, when only a DC component of the output xv of the multiplier 202 is extracted, the output yv of the filter circuit 204 is as shown in the following formula (9):

$$yv=(\text{a DC component of xy})=\sqrt{(6/4)} \cdot ivo \cdot R \quad (9)$$

Only the affection of the V phase offset appears in the output yv of the filter circuit 204. Further, the filter circuit 204 for extracting a DC component needs to be structured to adequately attenuate an AC of the 2θre component (the 2f component) of the formula (8).

Similarly, concerning the W phase, the following is obtained.

$$xw = Vda* \cdot w\_\sin \quad (10)$$
$$= \{ivo \cdot R \cdot \sqrt{2} - \sin(\theta re + 2\pi/3) +$$
$$iwo \cdot R \cdot \sqrt{2} \cdot \sin(\theta re + \pi/3)\} \cdot$$
$$\sin(\theta re + 2\pi/3 + \pi/2)$$
$$= \sqrt{(2/2)} \cdot ivo \cdot R \cdot \cos(2\theta re + 11\pi/6) -$$
$$\sqrt{(6/4)} \cdot iwo \cdot R - \sqrt{(2/2)} \cdot iwo \cdot$$
$$R \cdot \cos(2\theta re + 3\pi/2)$$

In the filter circuit 205, when only a DC component of the output xw of the multiplier 203 is extracted, the output yw of the filter circuit 205 is as shown in the following formula (11):

$$yw=(\text{a DC component of xw})=-\sqrt{(6/4)} \cdot ivo \cdot R \quad (11)$$

Only the affection of the W phase offset appears in the output yw of the filter circuit 205. Further, the filter circuit 205 for extracting a DC component needs to be structured to adequately attenuate an AC of the 2θre component (the 2f component) of the formula (10).

The V phase offset ivo and the W phase offset iwo may be directly calculated by the formula (9) and the formula (11) to subtract these from the detected current value, but it is better to structure with the proportional plus integration PI as shown in FIG. 6 such that it can be offset estimated on line during operation.

By doing so, an offset estimation can be conducted successfully even if the affection of the offsets of the V phase and the W phase appearing in the d axis voltage command Vda* is in somewhat different phase.

Figure 7:
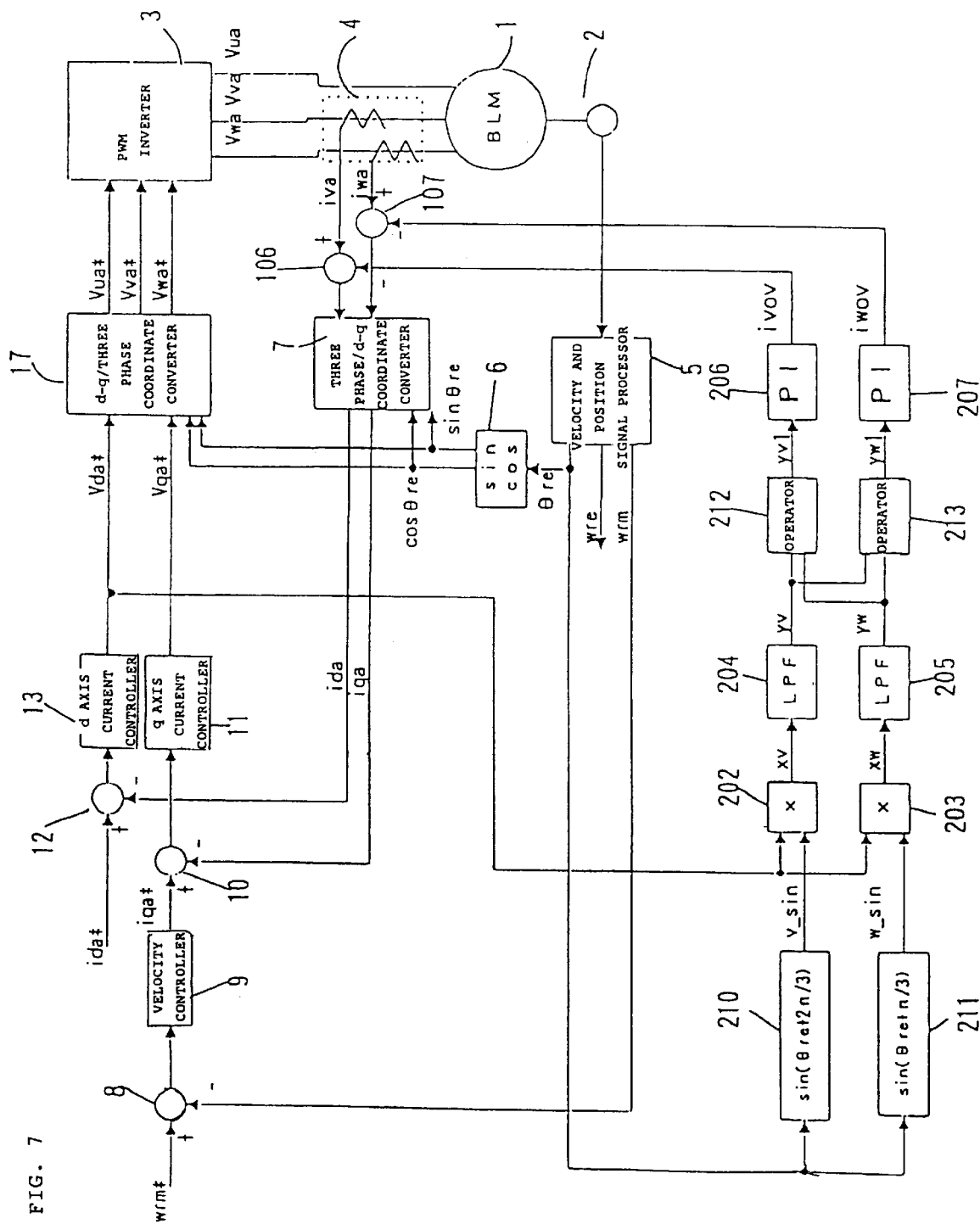
FIG. 7 is a structural view showing another example of a structure of a controlling device for an AC motor in accordance with the second embodiment of the present invention.

As an example of the structure other than the above mentioned one, a controlling device for an AC motor may be structured as shown in FIG. 7.

In the structure shown in FIG. 6, the sine wave outputs v_sin and w_sin are represented by the formula (6) and the formula (7), but the similar structure can be attained by the following formulas (12) and (13).

$$v\_\sin = \sin(\theta re + 2\pi/3) \quad (12)$$
$$w\_\sin = \sin(\theta re + \pi/3) \quad (13)$$

By doing so, when the d axis voltage command Vda* shown in the formula (5) is multiplied by the output v_sin of the sine wave generator 210 shown in the formula (12) by the multiplier 202 and a DC component is extracted in the filter circuit 204, the output yv of the filter circuit 204 is as shown in the following formula (14):

$$yv = (Vda* \cdot \text{DC component of } v\_\sin) \quad (14)$$
$$= \sqrt{(2/2) \cdot ivo \cdot R} + \sqrt{(2/4) \cdot iwo \cdot R}$$

Similarly, concerning the W phase, the following is obtained.

$$yw = (Vda* \cdot \text{DC component of } w\_\sin) \quad (15)$$
$$= \sqrt{(2/4) \cdot ivo \cdot R} + \sqrt{(2/2) \cdot iwo \cdot R}$$

From the formula (14) and the formula (15), the following is obtained.

$$ivo=2 \cdot \sqrt{2}/(3 \cdot R) \cdot (2 \cdot yv-yw) \quad (16)$$
$$iwo=2 \cdot \sqrt{2}/(3 \cdot R) \cdot (2 \cdot yw-yv) \quad (17)$$

An operator 212 and an operator 213 correspond to the formula (16) and the formula (17). Since outputs of the operator 212 and the operator 213 may have slight errors from the V phase offset ivo and the W phase offset iwo, they are marked as yv1 and yw1 in FIG. 7 and are structured so as to include the V phase offset estimator 206 and the W phase offset estimator 207 for estimating these errors on line.

As described above, a phase may be set as in the sine wave generators 200 and 201 shown in FIG. 6, or a phase may be set as in the sine wave generators 210 and 211 shown in FIG. 7. In either case, an offset can be correctly estimated during operation and a torque ripple never increases even if a temperature drift is caused.

Figure 8:
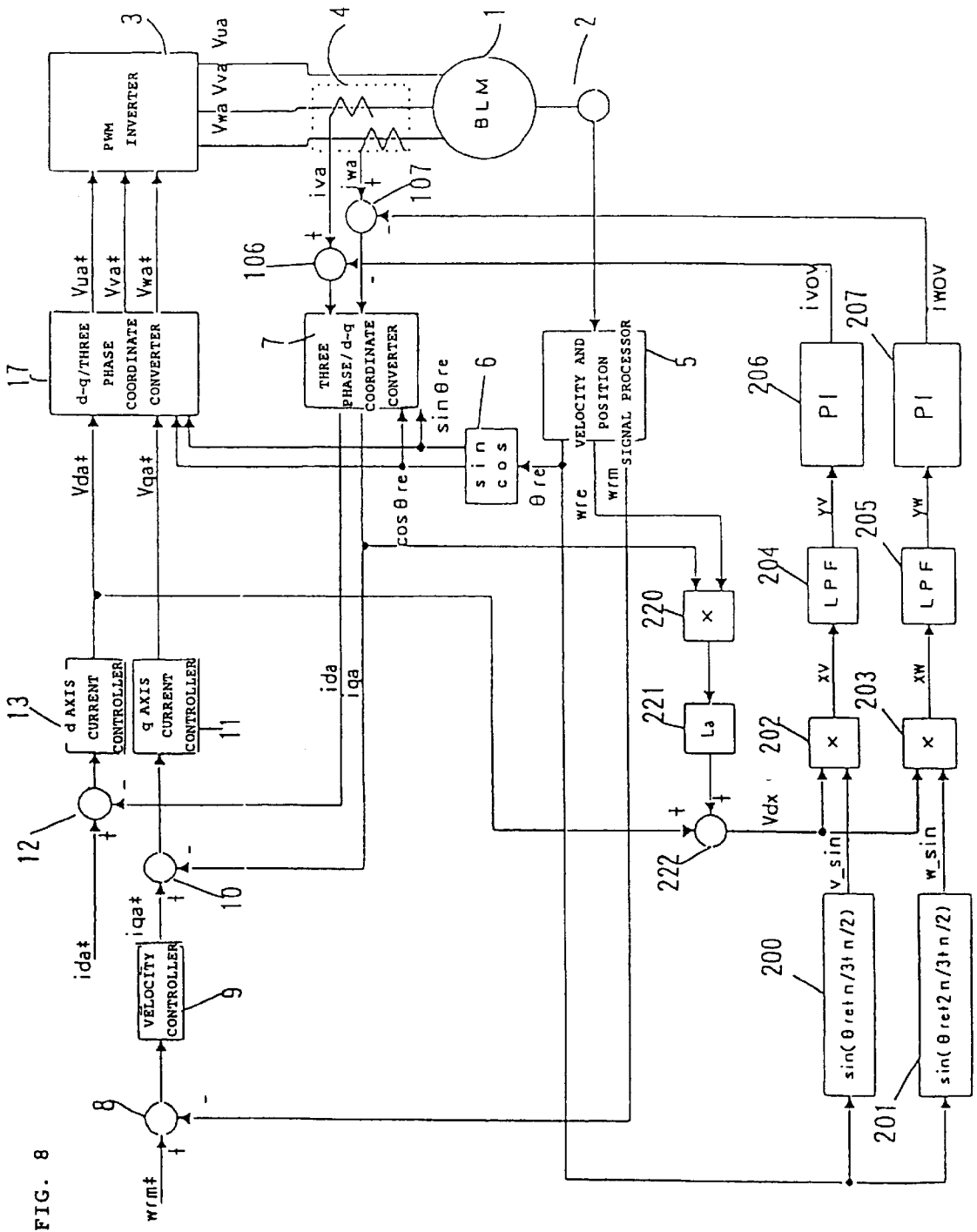
FIG. 8 is a structural view showing a controlling device for an AC motor in accordance with a third embodiment of the present invention.

Third Embodiment FIG. 8 is a block diagram of a controlling device for an AC motor in accordance with a third embodiment.

The third embodiment shown in FIG. 8 has a structure with the next block added to the structure of the second embodiment shown in FIG. 6. Reference numeral 220 denotes a multiplier for calculating the product of the torque split current iqa and the electrical angle velocity wre; 221, a gain circuit; and 222, an adder for adding the d axis voltage command Vda* and an output of the gain circuit 221, and the thus obtained output is marked Vdx.

An operation is now explained.

As described in the explanation about the non-interference control, the current control loop of the d axis conducts non-interference by the formula shown in the formula (1). When the motor 1 is non-interference controlled, it is represented as shown by block 1a of the d axis part in FIG. 2 with respect to the d axis. When it is not loaded, the torque split current iqa=0, resulting in the illustration in block 1a of the d axis part of FIG. 2 even if the motor 1 is not of non-interference. However, with the load increasing, the term (−wre·La·iqa) shown in the formula (1) becomes large and substantially affects the d axis current command Vda*. In this case, the affections of the V phase offset and the W phase offset rendered to the d axis current command Vda* is not realized. Therefore, it is necessary for the d axis current command Vda* used for an estimation to use the non-interference d axis voltage command.

FIG. 8 shows a method for readily producing the non-interference d axis voltage command.

When a non-interference control is conducted, the non-interference d axis voltage command can be easily calculated as the output Vdz* of the d axis current controller 13 of FIG. 14 from the formula (1). However, there are not so many cases in which non-interference control is not structured like this. In such a case, it can be easily calculated as shown in FIG. 8 with the following formula:

$$Vdx=Vda*+wre \cdot La \cdot iqa \quad (18)$$

The non-interference d axis voltage command Vdx can realize the relationship as shown in the formula (5) even if it is loaded, i.e., $$Vdx=ivo \cdot R \cdot \sqrt{2} \cdot \sin(\theta re+2\pi/3)+iwo \cdot R \cdot \sqrt{2} \cdot \sin(\theta re+\pi/3) \quad (19)$$

If it is structured as shown in FIG. 8 in order to estimate an offset using the non-interference d axis voltage command, an offset can be estimated satisfactorily even if it is loaded. Naturally, the same is true when non-interference control is conducted and the d axis voltage command Vdz* shown in the formula (1) is used.

Fourth Embodiment

Figure 9:
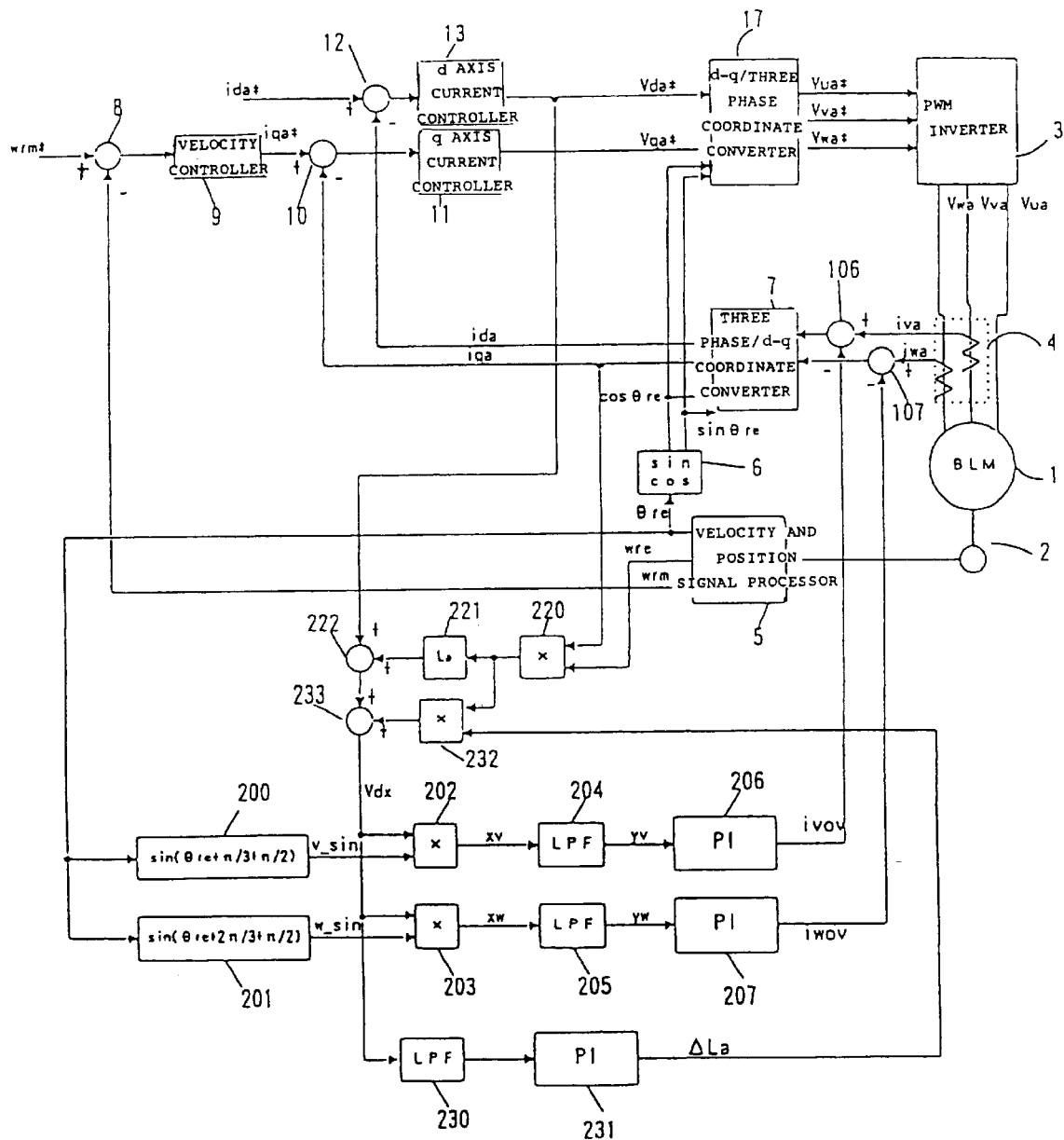
FIG. 9 is a structural view showing a controlling device for an AC motor in accordance with a fourth embodiment of the present invention.

FIG. 9 is a block diagram of a controlling device for an AC motor in accordance with a fourth embodiment of the present invention.

The fourth embodiment shown in FIG. 9 has a structure with the next block added to that of the third embodiment shown in FIG. 8. Reference numeral 230 denotes a low-pass filter circuit for extracting a DC component of the non-interference d axis voltage command Vdx; 231, an estimator for estimating a variable portion ΔLa of the inductance La from the output of the low-pass filter circuit 230; 232, a multiplier for multiplying·wre·La·iqa calculated by the multiplier 220 by ΔLa calculated by the estimator 231; and 233, an adder for adding the output we·ΔLa·iqa of the multiplier 232 to the output wre·La·iqa of the adder 222. Offset estimation is conducted with the added result as a new Vdx.

An operation is now explained.

When the non-interference d axis voltage command Vdx is calculated as shown in the third embodiment and then used for the offset estimation, this operates satisfactorily up to nearly 100% in a standard motor. However, in a motor the inductance of which largely changes due to the magnetic saturation, an offset estimation value-may have a ripple. This is because the d axis voltage inside the actual motor has the inductance La changing due to the magnetic saturation and the non-interference Vdx does not coincide with the d axis voltage inside the motor. The q axis current iqa has a DC component when loaded. It has the if ripple when there is an offset. When 1f of the q axis current iqa does not appear in Vdx if it is of non-interference, but if it is not successfully of non-interference, it becomes a factor for disordering a phase in which an affection of the offset shown in the formula (19) appears. When the phase is different from the formula (19), it makes the V phase offset affect the offset estimation value of the W phase and the estimation is not successful but is oscillatory.

This is a problem for a motor with the inductance having a tendency to vary or a motor that drives with larger load as it is magnetically saturated. FIG. 9 shows that an offset is estimated and at the same time the inductance La is estimated. Vdx has an average value of zero because it is controlled with ida*=0 if the non-interference is successful. Then, a DC component of Vdx is extracted from the low-pass filter 230 and the estimator 231 is provided in order to estimate the variable portion ΔLa of the inductance using its value. This includes, for example, the proportional plus integration PI. When the variable portion ΔLa of the inductance is so structured as shown in FIG. 9 referred to above, the non-interference d axis voltage command Vdx is as follows:

$$Vdx=Vda*+wre \cdot (La+\Delta La) \cdot iqa \quad (20)$$

Since the non-interference d axis voltage command Vdx is calculated with the inductance variable portion ΔLa estimated as above, an offset can be satisfactorily estimated even in a motor with the inductance largely changing or when it is largely loaded such as to cause the magnetic'saturation.

Fifth Embodiment

A fifth embodiment is now explained.

Figure 10:
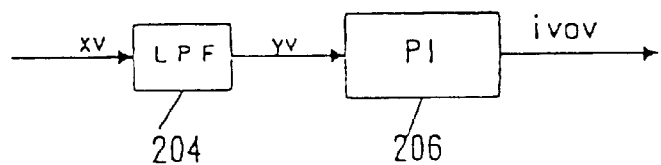
FIG. 10 is a structural view showing a main part of a controlling device for an AC motor in accordance with a fifth embodiment of the present invention.
Figure 10:
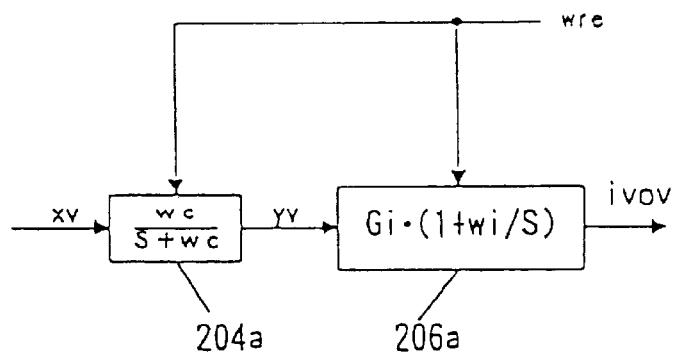

FIG. 10(*a*) shows portions of the low-pass filter circuit 204 and the V phase offset estimator 206, which are taken out from FIG. 6. FIG. 10(*b*) is a block diagram showing a main part of the fifth embodiment corresponding to FIG. 10(*a*). Symbol 204*a* denotes an example of a structure of the low-pass filter circuit, where it includes a first order lag filter of a cutoff frequency wc. Symbol 206*a* denotes an example of a structure of the V phase offset estimator, which consists of the PI controller of the proportional gain Gi and the breakpoint frequency wi. The first order lag filter 204*a* and the PI controller 206*a* input the electrical angle velocity Wre of the motor and change the cutoff frequency wc and the breakpoint frequency wi according to it. Only the V phase estimator side is shown here, but the W phase estimator side is also structured in the same manner.

An operation is now explained.

As shown in the formula (8), the input signal xv of the first order lag filter 204*a* has the component of 2θre, and it is necessary to adequately attenuate the component to extract a DC component. That is, at the time of the electrical angle velocity wre, a filter with an adequately low gain in the frequency of 2·wre should be used. For example, when the motor rotates at 10 Hz of the electrical angle equivalent, the twice or 20 Hz component needs to be adequately attenuated. On the other hand, when the motor rotates at 5 Hz, the 10 Hz component must be adequately attenuated. If the cutoff frequency of the first order lag filter 204*a* is not changed, a cutoff frequency with which no oscillation of 2·wre remains even in the low frequency region must be set from the beginning.

Further, the breakpoint frequency of the PI controller 206*a* must be set low corresponding to it. This results in an extremely late response of the offset estimation loop. In such a case, the cutoff frequency wc and the breakpoint frequency wi are to be determined as follows:

$$wc=2 \cdot wre/10 \quad (21)$$

$$wi=2 \cdot wre/50 \quad (22)$$

By doing so, an offset can be estimated with an automatic proper response depending on the number of rotations of the motor. In a case where a normal operation is conducted at 10 Hz or more in many cases but not at a frequency lower than that, this is very effective when "there is a problem that a response is extremely late if wc and wi are determined as fixed values so as to be suited to the case of low frequency of use" and, "if wc and wi are set high in order to facilitate a response, there is a problem that an offset estimation value in the extremely low velocity region becomes oscillatory." Further, there is also a method not to conduct an estimation in the extremely low velocity region. It can be easily realized by compulsorily making the value zero in the region where the output xy of the multiplier 202 and the output xw of the multiplier 203 are not estimated. When an estimation is stopped as described above, the offset value before the estimation is retained if the offset estimator 206 has an integration element.

Sixth Embodiment

A sixth embodiment is now explained.

Figure 11:
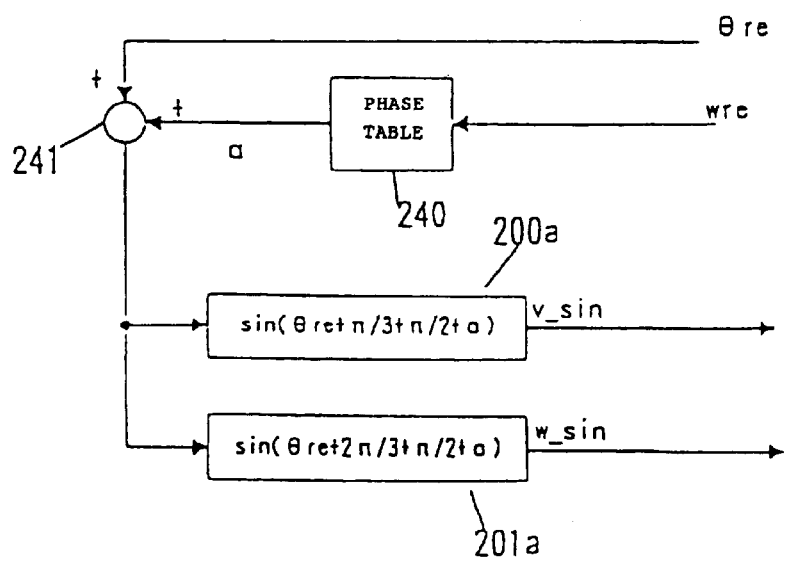
FIG. 11 is a structural view showing a main part of a controlling device for an AC motor in accordance with a sixth embodiment of the present invention.

FIG. 11 is a block diagram of a main part showing the sixth embodiment with respect to the parts of sine wave generators 200 and 201 that output v_sin and w_sin in the second embodiment shown in the block diagram of FIG. 6. Those not shown herein are the same as those in FIG. 6. In FIG. 11, new reference numeral 240 denotes a phase table that determines in advance what kind of a phase a the transfer function shown in the formula (3) will be by the electrical angle velocity wre and holds it as a table. Reference numeral 241 denotes an adder that adds the electrical angle Ore and the above-described phase a. Symbol 200a denotes a sine wave generator, and the sine wave generator 200a is used to generate the sine wave v_sin as shown in the following formula (23):

$$v\_sin = \sin(\theta re + \pi/3 + \pi/2 + \alpha) \qquad (23)$$

Further, Symbol 201a also denotes a sine wave generator, and the sine wave generator 201a is used to generate the sine wave w_sin as shown in the following formula (24):

$$w\_sin = \sin(\theta re + 2\pi/3 + \pi/2 + \alpha) \qquad (24)$$

An operation is now explained.

As has already been explained, at the time of no load, the transfer function G (s) from the V phase offset to the d axis voltage command Vda* is shown as in the formula (3). The transfer function is G (s): R in the adequately low velocity region, which indicates the transfer without a phase lag. However, in the high velocity region, a phase changes according to the transfer function G (s). As an example of the phase lag, it has been found that the phase lag of approximately the maximum 60 deg at the motor rotation velocity 1000 r/min is generated when calculated with the 200 W motor. With this degree of the phase lag, the separation of the V phase offset to the W phase offset is not conducted successfully. Hence, a phase lag volume is calculated in advance with the formula (3) and is held in the phase table 24.0. By manipulating $v\_{sin\ and\ w}\_sin$ to be multiplied by the d axis voltage command used for an estimation with the phase lag, the affections of the V phase offset and the w phase offset can be separated even if the motor rotates in high velocity and the above mentioned phase lag is caused, allowing the both offsets to be correctly estimated.

Seventh Embodiment

Figure 12:
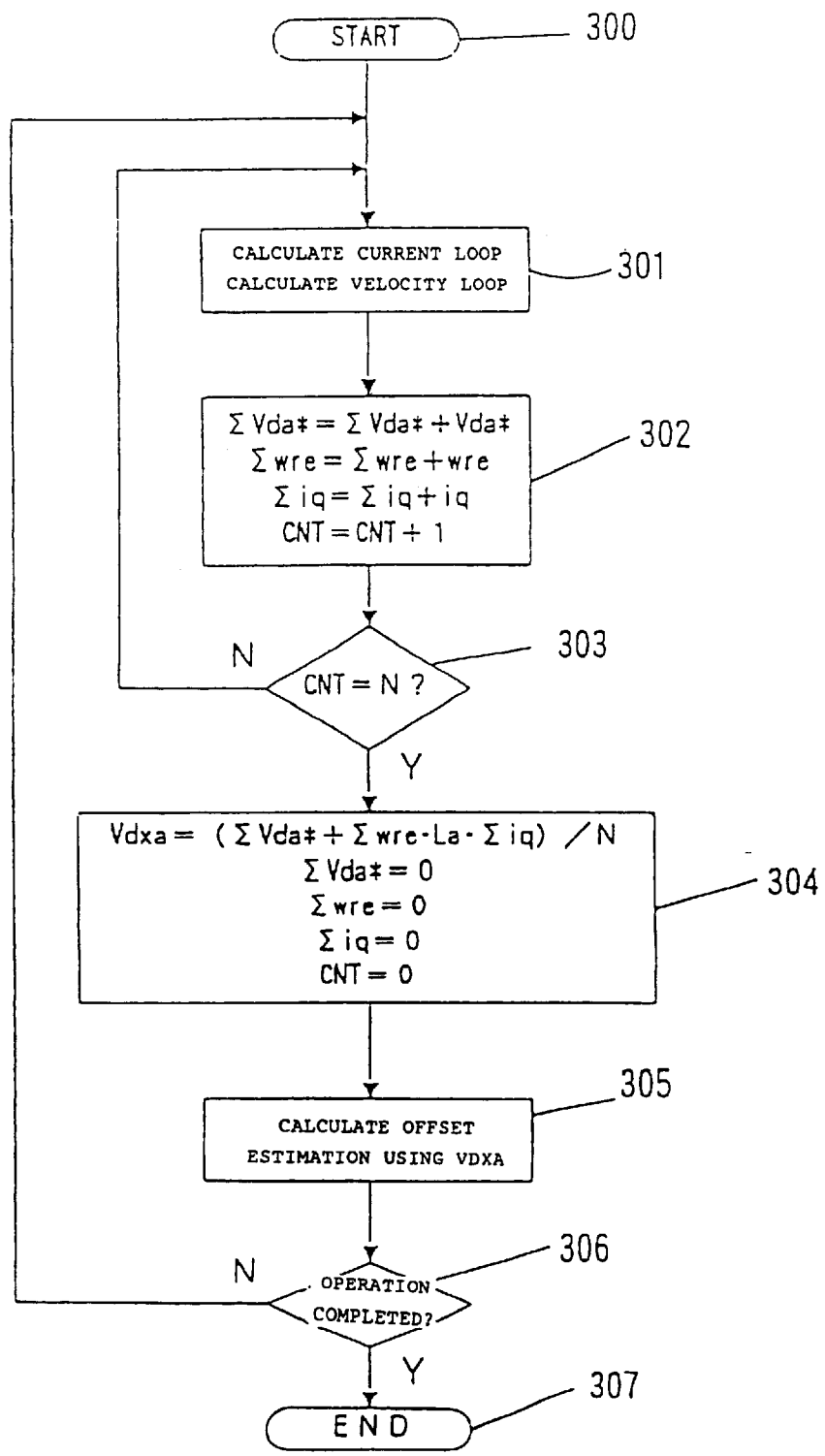
FIG. 12 is a flow chart showing a controlling device for an AC motor in accordance with a seventh embodiment of the present invention.

FIG. 12 is a flow chart describing a seventh embodiment.

Referring to FIG. 12, in 300, START shows the start of an operation. In 301 shown are operational loops for an ordinary current control and a velocity control. In 302, the d axis voltage command Vda*, the motor electrical angle velocity wre, and the q axis current iq (:torque split current iqa) are added, and at the same time, a counter CNT is counted up. In 303, it is determined whether the counter CNT has reached the number of times N that is set in advance, and it is structured to repeat 301 and 302 until the counter CNT reaches the number of times N. In 304, the d axis voltage command Vdxa is calculated as follows using the d axis voltage command Vda*, the motor electrical angle velocity wre, the added values ΣVda*, Σwre and Σiq of N times the q axis current iq:

$$Vdxa = (\Sigma vda^* + \Sigma wre \cdot La \cdot \Sigma iq)/N \qquad (25)$$

Then, these added values ΣVda*, Σwre and Σiq and the value CNT of the counter are cleared. In 305, an offset is estimated using the non-interference d axis voltage command Vdxa calculated as in the above formula (25) in place of the non-interference d axis voltage command Vdx of the third embodiment shown in FIG. 8. In 306, it is determined whether the operation is completed, and it is structured that if the operation is not finished, the above mentioned 301 through 305 are repeated. At the time of finishing the operation, the process ends at 307.

The operation is now explained.

For example, there is a case in which a current sampling is conducted at S/W, a current loop and a velocity loop operate for a sampling time of 200 us and the estimation of an offset cannot be operated for the same time of 200 us due to the problem of an operating time. In such a case, for example, the estimation of an offset can be conducted for the time period 16 times as long as the sampling time. In this case, however, since the operating cycle is 3.2 ms that is 16 times as long as 200 us, the estimation may not be successfully conducted. Hence, as shown in the above formula (25), the d axis voltage command Vda*, the motor electrical angle velocity wre, and the added values ΣVda*, Σwre and Σiq for N times of the q axis current iq are calculated for each of the sampling times of the current loop, and an offset can be satisfactorily estimated by using the values.

That is, when an offset operation of a current detector is conducted at the sampling cycle n times (n is a positive integral number) as long as the sampling time of the current controlling system, an offset can be satisfactorily estimated by conducting an offset estimation using the average value of n times for the d axis voltage command to be output at each sampling cycle of the current controlling system. In addition, with such a structure, an offset can be satisfactorily estimated even if the current detecting resolution is low to some extent.

Eighth Embodiment

Figure 13:
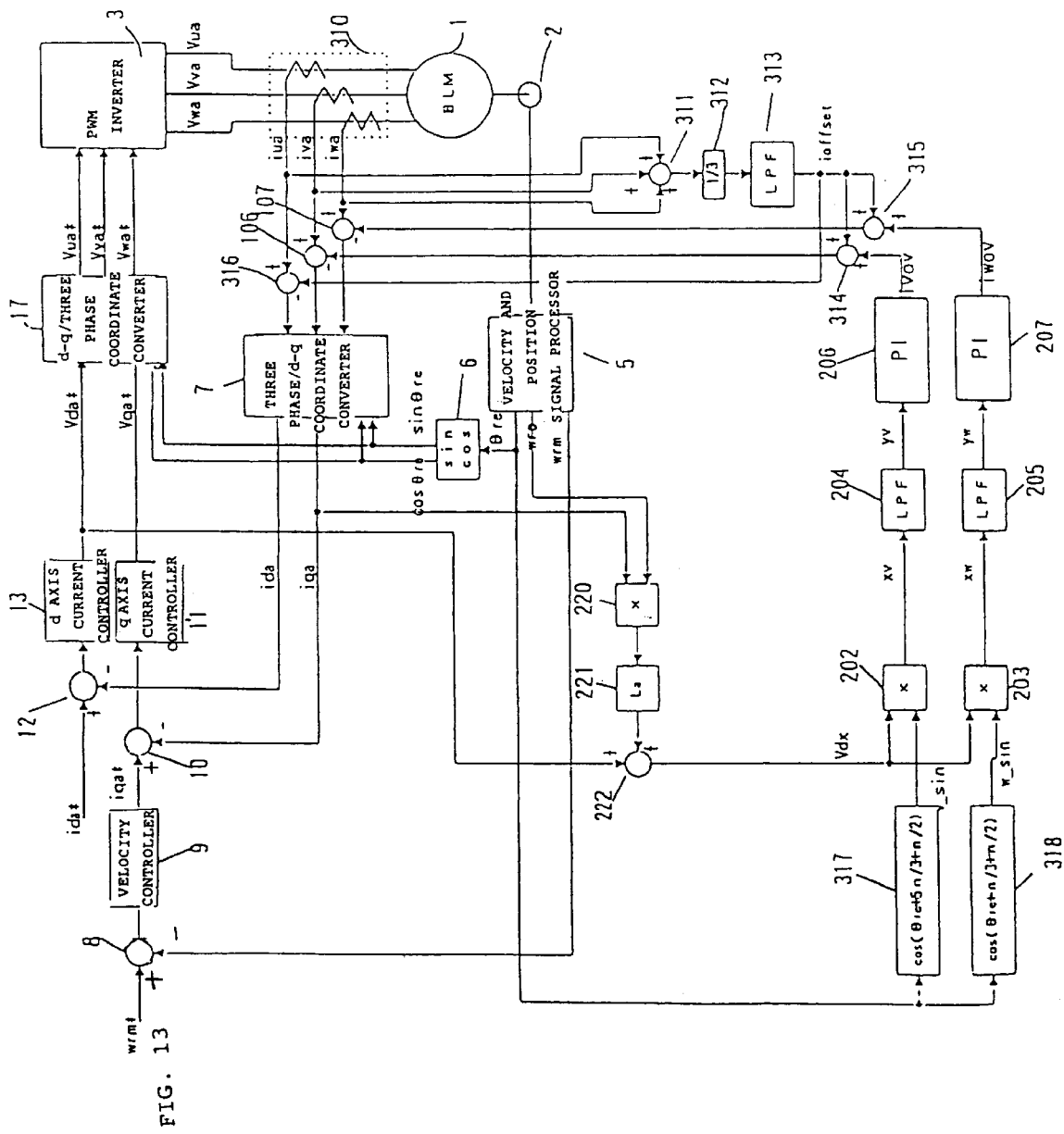
FIG. 13 is a structural view showing a controlling device for an AC motor in accordance with an eighth embodiment of the present invention.

FIG. 13 is a view showing an eighth embodiment.

In FIG. 13, the same parts as those in the third embodiment shown in FIG. 8 are given the same numbers and their explanations are omitted. New reference numeral 310 denotes a current detector that detects three phase current detection values iua, iva and iwa. Reference numeral 311 denotes an adder that adds the above three phase current detection values iua, iva and iwa. Reference numeral 312 denotes a gain circuit that makes the output of the adder 311 ⅓. That is, the output of the gain circuit 312 is made an average of the three phase current detection values iua, iva and iwa. Reference numeral 313 denotes a low-pass filter that removes the high frequency ripple of the output of the gain circuit 312. The output of the low-pass filter 313 is referred to as an offset current ioffset. Reference numeral 314 denotes an adder that adds the output of the V phase offset estimator 206 and the value of the above offset current ioffset, and reference numeral 315 denotes an adder that adds the output of the W phase offset estimator 207 and the value of the above offset current ioffset. Reference numeral 316 denotes a subtractor that subtracts the above offset current ioffset from the U phase current detection value iua. Further, Reference numeral 317 and 318 denote sine wave generators that generate the sine waves v_sin and w_sin, respectively, and for example, generate sine waves shown in the following formulas:

$$v\_sin = \cos(\theta re + 5\pi/3 + \pi/2) \qquad (26)$$

$$w\_sin = \cos(\theta re + \pi/3 + \pi/2) \qquad (27)$$

The principle of an operational is now explained.

In the case of the three phase current detection, considering it in the same manner as in the two phase current detection, when current detection offset values for the three phases are iuo, ivo and iwo, respectively, the non-interference d axis voltage command Vdx is as shown in the following formula (28):

$$Vdx = iuo \cdot R \cdot \sqrt{(2/3)} \cdot \cos(\theta re + \pi)$$

$$+ ivo \cdot R \cdot \sqrt{(2/3)} \cdot \cos(\theta re + \pi/3)$$

$$+ iwo \cdot R \cdot \sqrt{(2/3)} \cdot \cos(\theta re + 5\pi/3) \quad (28)$$

where each offset value is defined as follows:

$$iuo = ioffset \quad (29)$$

$$ivo = ioffset + \Delta ivo \quad (30)$$

$$iwo = ioffset + \Delta iwo \quad (31)$$

Then, the above formula (28) can be modified as follows:

$$Vdx = \Delta ivo \cdot R \cdot \sqrt{(2/3)} \cdot \cos(\theta re + \pi/3) + \Delta iwo \cdot R \cdot \sqrt{(2/3)} \cdot \cos(\theta re + 5\pi/3) \quad (32)$$

That is, the offset current ioffset that is common to all the phases does not affect, but only the deviation portions $\Delta ivo$ and $\Delta iwo$ from the offset current ioffset affect. This is true for the torque ripple. Therefore, it is the object of the eighth embodiment to detect the deviation portions in the same manner as in the two phase current detection and to structure such that the common offset is estimated utilizing the fact that the sum of the three phases are zero.

An operation is now explained in detail.

The offset current ioffset obtained through the adder 311, the gain circuit 312 and the low-pass filter 313 can be represented as follows:

$$ioffset = DC \text{ component of } \{(iua + iva + iwa)/3\} \quad (33)$$

This is an offset that is common to the three phases and is not a cause for directly generating a torque ripple, but is a cause of disorder of the operation of the motor 1 as a DC magnetic deflection. Therefore, it is structured to subtract the offset current ioffset from the detected current value. For example, it is subtracted by the subtractor 316 in the U phase. It is added to the deviation from the offset current ioffset of the V phase offset separately estimated by the adder 314 in the V phase, and is consequently subtracted by the subtractor 106. It is structured in the same manner in the W phase as in the V phase.

Estimation of the deviation portions $\Delta ivo$ and $\Delta iwo$ from the ioffset of the V phase and W phase offsets is now discussed.

It is structured such that the non-interference d axis voltage command Vdx shown in the formula (32) and the sine wave v_sin shown in the formula (26) are multiplied by the multiplier 202 and the DC component is extracted by the low-pass filter 204, so that the output yv of the low-pass filter 204 is as follows:

$$yv = /(2/4) \cdot R \cdot \Delta ivo \quad (34)$$

Similarly, concerning the W phase, the output yw is as follows:

$$yw = \sqrt{(2/4)} \cdot R \cdot \Delta iwo \quad (35)$$

Therefore, since the offset deviation $\Delta ivo$ of the V phase can be separated to yv and the offset deviation $\Delta iwo$ of the W phase can be separated to yw, the offset can be estimated in the same manner as in the two phase current detection. In this way, in the case of the three phase current detection, a successful estimation and cancellation can also be attained even if the offset of the current detector 310 exists, realizing a smooth operation without a torque ripple.

The effects according to the present invention as described above are listed as follows:

In accordance with the present invention, since an affection of the current detection offset appearing in the d axis split voltage command is extracted and the offset of the current detector is compensated for, the offset compensation can be satisfactorily conducted without stopping a motor even if a temperature drift is caused by the current detector, and the motor can rotate smoothly without a torque ripple.

Further, in the case of the two phase current detection, since the detected offset of the current detector in each phase is simultaneously and satisfactorily estimated and compensated for, the offset compensation can be satisfactorily conducted without stopping a motor even if a temperature drift is caused by the current detector and the motor can rotate smoothly without a torque ripple.

Further, even in the case in which a torque is applied, an offset of the current detector can be satisfactorily estimated and compensated for.

Further, even in the case in which an inductance set value of a motor has an error or changes due to magnetic saturation and so on, an offset of the current detector can be satisfactorily estimated and compensated for.

Further, since it can be estimated with an appropriate gain according to a velocity, a velocity range that can be estimated can be extended and an estimation loop makes an appropriate response, and an offset of the current detector can be satisfactorily estimated and compensated for.

Further, since an offset of the current detector can be satisfactorily estimated and compensated for even in the high rotation region, an upper limit of the velocity that can be estimated may be eliminated.

Further, even in the case of lack of the operating time or lack of the current detection resolution, an offset of the current detector can be satisfactorily estimated and compensated for.

Further, in the case of the three phase detection, an offset of the current detector can be satisfactorily estimated and compensated for.

Industrial Applicability

As has been described, the present invention can provide a controlling device for an AC motor having a structure in which a current of a three phase brushless DC motor is detected and then converted to a rotor coordinate system, to separately control a torque split current (q axis) and an exciting split current (d axis), wherein an offset of a current detector is estimated with an inverter output frequency component of a d axis voltage command which is an output of an exciting split current controller and an offset cancellation of the detected current value is conducted, so that an offset of the current detector may be estimated and compensated for during its operation without stopping its rotation and the motor can rotate smoothly without a torque ripple, even in the case in which the current detector has an offset error or in the case in which an offset changes due to a temperature drift.

What is claimed is:

1. A controlling device for an AC motor comprising:
   a three phase AC motor;
   current detecting means for detecting a current flowing to said three phase AC motor;
   a rotational coordinate converting means for inputting a current detected by said current detecting means and converting it to an exciting split current and a torque split current in a rotational coordinate system;
   current controlling means for respectively outputting a d axis voltage command and a q axis voltage command that are based on an exciting split current deviation and a torque split current deviation given by the comparative difference between the exciting split current and the torque split current from the rotational coordinate converting means, and an exciting split current command and a torque split current command;

an encoder directly connected to said three phase AC motor;

signal processing means for calculating a mechanical angular velocity, an electrical angle velocity and an electrical angle of said three phase AC motor based on a signal from said encoder;

a sine wave generator for generating a sine wave corresponding to the electrical angle provided by said signal processing means;

three phase coordinate converting means for inputting the d axis voltage command and the q axis voltage command from said current controlling means and the sine wave from said sine wave generator and coordinate converting it to a three phase AC voltage command to output;

an inverter for supplying a driving voltage to said three phase AC motor based on the three phase AC voltage command from said three phase coordinate converting means;

offset estimating means for estimating an offset of said current detecting means based on the d axis voltage command from said current controlling means and the output from said signal processing means: and subtracting means for subtracting an offset estimation value provided by said offset estimating means from the current detected by said current detecting means and giving an offset canceled current value to the rotational coordinate converting means.

2. The controlling device for an AC motor in accordance with claim 1, characterized in that said offset estimating means comprises: a band-pass filter for extracting a component corresponding to the electrical angle velocity of the d axis voltage command based on the d axis voltage command from said current controlling means and the electrical angle velocity provided by said signal processing means; an absolute value circuit for rectifying a signal output from said band-pass filter; a low-pass filter for extracting a low frequency component of the signal from said absolute value circuit; a switch for switching a phase conducting an estimation of a current offset using the signal of said low-pass filter; and estimating means for estimating a current offset based on the signal from said low-pass filter that is input via said switch.

3. The controlling device for an AC motor in accordance with claim 1, characterized in that said offset estimating means comprises: sine wave generating means for outputting a sine wave corresponding to the electrical angle provided by said signal processing means; multiplying means for conducting a multiplication of the d axis voltage command from said current controlling means and the sine wave corresponding to the electrical angle provided by said sine wave generating means; filtering means for extracting a DC component from the output of said multiplying means; and estimating means for estimating a current offset based on a signal from said filtering means.

4. The controlling device for an AC motor in accordance with claim 3, characterized in that said offset estimating means further comprises: a first multiplier for calculating the product of the torque split current from said rotational coordinate converting means and the electrical angle velocity provided by said signal processing means; a gain circuit for obtaining a signal proportional to the output of said first multiplier; and a first adder for obtaining a non-interference d axis voltage command that is calculated by adding the d axis voltage command from said current controlling means and a signal proportional to the electrical angle velocity via said gain circuit, wherein the non-interference d axis voltage command is used as the d axis voltage command given to said multiplying means.

5. The controlling device for an AC motor in accordance with claim 4, characterized in that said offset estimating means further comprises: a low-pass filter for extracting a DC component of the non-interference d axis voltage command given to said multiplying means; an inductance varying portion estimator for estimating a varying portion of an inductance from the output of said low-pass filter; a second multiplier for multiplying the output of said first multiplier with the output of said inductance varying portion estimator; and a second adder for obtaining a new non-interference d axis voltage command that is calculated by adding the output of said first adder and the output of said second multiplier, wherein the new non-interference d axis voltage command obtained from said second adder is used as the d axis voltage command given to said multiplying means.

6. The controlling device for an AC motor in accordance with claim 3, characterized in that said filtering means further includes a first order lag filter having a predetermined cutoff frequency, and said estimating means includes a PI controller having a predetermined proportional gain and a predetermined breakpoint frequency, the cutoff frequency and the breakpoint frequency varying according to the electrical angle velocity provided by said signal processing means.

7. The controlling device for an AC motor in accordance with claim 3, characterized in that said offset estimating means further comprises: a phase table for outputting a phase corresponding to the electrical angle velocity provided by said signal processing means; and a third adder for adding the electrical angle provided by said signal processing means and the phase output by said phase table, wherein said sine wave generating means generates a sine wave corresponding to the output from said third adder.

8. The controlling device for an AC motor in accordance with claim 4, characterized in that the non-interference d axis voltage command given to said multiplying means is calculated using an average value of values that are calculated by adding the d axis voltage commands obtained each time a predetermined sampling is conducted and by adding the electrical angle velocity and the torque split current, respectively.

9. The controlling device for an AC motor in accordance with claim 1, characterized in that said current detecting means includes a structure for detecting each phase current of the three phase AC, and said subtracting means includes a structure for calculating a current value offset canceled for each phase of the three phase AC, and said offset estimating means further comprises: a fourth adder for adding a detected current of three phase portion detected by said current detecting means; one phase portion offset estimating means for estimating an offset of one phase portion by the output of said fourth adder; and adding means for adding the offset of one phase portion estimated by said one portion offset estimating means to the offset from said offset estimating means estimated based on the d axis voltage command from said current controlling means and the output from said signal processing means, and for obtaining an offset of two phase other than the offset of one phase portion estimated by said one phase portion offset estimating means.

* * * * *